United States Patent

Hara

[11] Patent Number: 5,802,923
[45] Date of Patent: Sep. 8, 1998

[54] SHIFTING APPARATUS FOR A BICYCLE

[75] Inventor: Nobukatsu Hara, Sakai, Japan

[73] Assignee: Shimano, Inc., Osaka, Japan

[21] Appl. No.: 396,123

[22] Filed: Feb. 28, 1995

[30] Foreign Application Priority Data

Mar. 7, 1994 [JP] Japan ................................. 6-035845

[51] Int. Cl.$^6$ ........................... B60K 20/02; B62M 25/04
[52] U.S. Cl. ................................... 74/473.13; 74/489
[58] Field of Search ........................... 74/489, 502.2, 74/475, 473.13

[56] References Cited

U.S. PATENT DOCUMENTS

| 4,325,267 | 4/1982 | Kojima ............................ 74/489 |
| 5,577,413 | 11/1996 | Tagawa et al. ..................... 74/475 |

FOREIGN PATENT DOCUMENTS

| 0 485 955 | 5/1992 | European Pat. Off. . |
| 0 628 475 | 12/1994 | European Pat. Off. . |
| 1042094 | 10/1953 | France . |
| 9212927.7 | 1/1993 | Germany . |

Primary Examiner—Charles A. Marmor
Assistant Examiner—Troy Grabow
Attorney, Agent, or Firm—James A. Deland

[57] ABSTRACT

A shifting apparatus for a bicycle includes a takeup element for winding and unwinding a control cable, a first shift member supported to be rotatable substantially along an outer periphery of a handlebar for rotating the takeup element, a second shift member supported by the handlebar for rotating the takeup element backward, and a positioning mechanism for retaining the takeup element in a selected angular position. An interlock mechanism is provided for interlocking the first shift member and takeup element, such that the takeup element is not always rotatable with the first shift member. This interlock mechanism allows the first shift member to remain still when the takeup element is rotated backward in an unwinding direction. Further, the shifting apparatus is constructed at low cost, with the first shift member having an axis of rotation extending at an angle to a handlebar axis.

20 Claims, 6 Drawing Sheets

SHIFTING APPARATUS FOR A BICYCLE

BACKGROUND OF THE INVENTION

1. Field of the Invention

The present invention relates to a shifting apparatus for a bicycle. More particularly, the invention relates to a shifting apparatus having a shift member rotatably mounted on a handlebar, and a takeup element rotatable in response to rotation of the shift member relative to the handlebar to wind or unwind a cable.

2. Description of the Related Art

In a shifting apparatus of the type noted above, the shift member is rotatable about a handlebar axis. This feature provides the advantage of allowing the cyclist to operate the shift member while holding the handlebar.

This type of shifting apparatus is known from German Utility Model Publication DE G9212927, for example. The shifting apparatus disclosed in this publication includes a first shift member mounted on a handle to be rotatable about a handlebar axis, a cable takeup drum rotatable with the first shift member, a ring rotatable with the takeup drum and having a plurality of engaging recesses arranged circumferentially thereof, and a pivotable pawl supported on the handlebar or the like and biased in a direction to engage an engaging recess to control rotation in an unwinding direction of the takeup drum. A cable is wound on the takeup drum when the cyclist rotates the shift member in a direction to move an upper surface thereof toward the cyclist. When the rotation of the takeup drum reaches a predetermined angle, the pivotable pawl engages a next engaging recess of the ring. If the cyclist stops movement of his or her hand rotating the shift member, the takeup drum is maintained in a position of the predetermined angle, i.e. an operation to shift by one stage is completed with the cable taken up. To effect a shifting operation in the unwinding direction, the cyclist may push a lever connected to the other end of the pivotable pawl. Then, the pivotable pawl is disengaged from the engaging recess of the ring to cancel positioning of the takeup drum. At this time, the takeup drum is rotated in the unwinding direction by the cable pulled by a return spring of a derailleur. The pivotable pawl engages an immediately next engaging recess if the cyclist stops pushing the lever of the pivotable pawl immediately after commencement of rotation in the unwinding direction of the takeup drum. As a result, the takeup drum is stopped rotating, which completes the operation to unwind the cable to effect a shift by one stage. The pivotable pawl acts also as a control member for allowing rotation in the unwinding direction of the takeup drum. Thus, this pivotable pawl may be called herein a second shift member for expediency of description.

In the above conventional apparatus, the first shift member and takeup drum are rigidly interconnected. This provides a low degree of structural freedom resulting in varied inconveniences noted below.

In the above conventional structure, when the pivotable pawl acting as a second shift member is raised to allow the takeup drum to rotate in the unwinding direction, the first shift member must rotate with the takeup drum. In other words, when effecting a shifting operation in the unwinding direction, the cyclist must take the trouble of removing his or her hand from the first shift member in order not to interfere with rotation of the first shift member. Alternatively, the cyclist may leave the hand on the first shift member, but must deliberately rotate the first shift member. After all, the cyclist must inevitably take the trouble of helping the takeup drum to rotate in the unwinding direction simultaneously with an operation to raise the pivotable pawl. Thus, there is room for improving the structure so that the first shift member does not rotate with the takeup drum rotating in the unwinding direction. However, it has been difficult to realize such improvement while retaining the rigid connection between the first shift member and takeup drum.

It is considered effective to incline the axis of rotation of the first shift member with respect to the handlebar axis as an improvement to enable a natural and easy movement of the cyclist's hand in operating the rotation type first shift member. However, it has been difficult to implement this improvement while retaining the rigid connection between the first shift member and takeup drum. That is, in order to incline an axis of rotation of a rotatable member with respect to the handlebar axis, it would be necessary to form a separate support mounted on the handlebar for supporting the rotatable member. Where the first shift member and takeup drum are rigidly interconnected, the axis of rotation of not only the first shift member but the takeup drum must be inclined. The inclined support of the rotatable member must support both the first shift member and takeup drum. Furthermore, the takeup drum constantly withstands the biasing force applied by the return spring of the derailleur through the cable. In time of a shifting operation, the takeup drum receives an additional load of shifting a chain through the cable. Thus, a high degree of strength would be required of the inclined support for supporting the first shift member rigidly connected to the takeup drum. An inclined support having a high degree of strength and a long span for supporting both the takeup drum and first shift member can hardly be realized without losing compactness of the entire shifting apparatus and without raising the cost.

SUMMARY OF THE INVENTION

The object of the present invention is to provide a basic construction of an improved shifting apparatus for a bicycle easy to operate. Such a construction includes a mechanism for inhibiting a first shift member from rotating when a takeup drum rotates in an unwinding direction, to relieve the cyclist of the necessity to remove his or her hand from the first shift member. Further, such a construction may include a first shift member inclined with respect to a handlebar axis to enable a natural and easy movement of the hand in operating the first shift member. Such a shift member should be realized simply and at low cost while retaining compactness of the entire shifting apparatus.

The above object is fulfilled, according to the present invention, by a shifting apparatus for a bicycle comprising:

a takeup element supported to be rotatable for winding and unwinding a control cable;

a first shift member supported by a handlebar to be rotatable substantially along an outer periphery thereof for rotating the takeup element in at least one direction;

a second shift member supported by the handlebar to be displaceable relative thereto for rotating the takeup element in at least a direction opposite to the one direction; and a positioning mechanism for retaining the takeup element in a selected angular position;

characterized in that the takeup element is rotatable separately from the first shift member; and that a first interlock mechanism is provided for interlocking the first shift member and the takeup element.

In the shifting apparatus according to the present invention, as set out above, the takeup element is rotatable separately from the first shift member, and at the same time a first interlock mechanism is provided for interlocking the first shift member and the takeup element. These features provide a structural freedom that the first shift member and takeup drum are not rigidly interconnected. With this freedom, the shifting apparatus according to the present invention has the following advantages.

As in a shifting apparatus described as a first embodiment in the Preferred Embodiments of the Invention hereof, a clutch may be provided for interlocking the first shift member and takeup drum. This is made possible by the structural freedom that the first shift member and takeup drum are not rigidly interconnected. The clutch produces the effect that the first shift member does not rotate when the takeup drum is rotated in an unwinding direction by the second shift member. That is, when operating the second shift member, the cyclist need not take the trouble of removing his or her hand from the first shift member not to interfere with rotation of the first shift member. The cyclist can operate the second shift member while gripping the handlebar with the entire palm of the hand. This enables shifting operations to be carried out in a stable manner during a bicycle run.

Next, as in shifting apparatus described herein as a second and a third embodiments, the first shift member may have an axis of rotation inclined with respect to a handlebar axis so that the cyclist may operate the first shift member with a natural and easy movement of a hand. This first shift member may be incorporated while retaining compactness of the entire shifting apparatus and at low cost. This is made possible by the structural freedom that the first shift member and takeup drum are not rigidly interconnected. In this case, only the first shift member is inclined with respect to the handlebar axis, leaving the axis of rotation of the takeup drum basically intact. An inclined support for supporting only the first shift member may have a simple structure and may be formed of a material of low strength, compared with an inclined support for supporting also the takeup drum subjected to a direct load from a control cable. Further, the support may have a small span. The inclined first shift member rotatable with a natural and easy movement of a hand also enables steady shifting operations during a run.

In addition, the structural freedom that the first shift member and takeup drum are not rigidly interconnected, which results from the features of the present invention, allows varied modifications to be made to the first and second embodiments noted above and described in greater detail later.

A first modification may be implemented as follows. The first shift member is rotatable in opposite directions to rotate the takeup element in a winding direction as well as an unwinding direction. At the same time, the second shift member also is capable of rotating in the winding direction as well as unwinding direction. According to this modification, the cyclist may, during a bouncy run, carry out both shift-up and shift-down operations only by means of the first shift member while steadily gripping the handlebar. During a relatively smooth run, the cyclist may carry out both shift-up and shift-down operations only be means of the second shift member. Thus, the cyclist may selectively use the first and second shift members at will according to running conditions, to facilitate shifting operations.

The first modification may of course be further modified. The first shift member is rotatable in opposite directions to rotate the takeup element in a winding direction as well as an unwinding direction. However, the second shift member may be adapted to cause the takeup element to rotate in only the winding direction or unwinding direction.

A second modification may be implemented as follows. Where the shifting apparatus is used for controlling a rear derailleur, for example, the takeup element is rotated in the winding direction to effect a shift-down operation, which usually requires a strong operating force. The first shift member, which may be held between a thumb and a first finger to apply a strong operating force, may be used exclusively for the heavy shift-down operation. On the other hand, the takeup element is rotated in the unwinding direction to effect a shift-up operation, which requires only a light operating force. The second shift member suited for operation with a single finger may be used exclusively for the light shift-up operation.

Other features and advantages of the present invention will be apparent from the following description of the preferred embodiments taken with reference to the drawings.

DETAILED DESCRIPTION OF THE PREFERRED EMBODIMENTS

Figure 1:
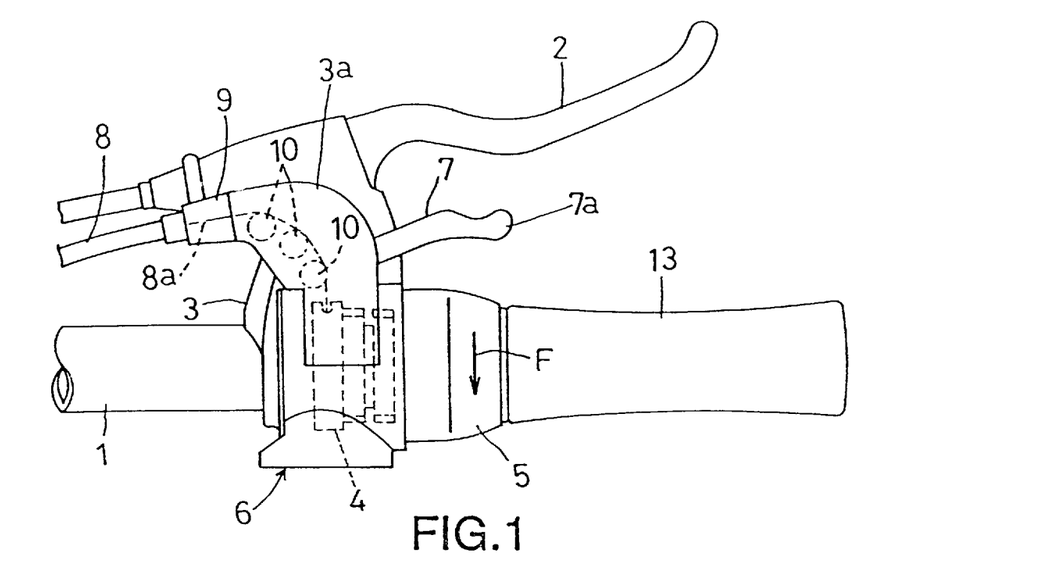
FIG. 1 is a plan view of a shifting apparatus for a bicycle according to the present invention.

A first embodiment of the present invention will be described. As shown in FIG. 1, a bicycle handlebar 1 supports a lever bracket 3 fixed tight thereto and having a brake lever 2. The lever bracket 3 includes a takeup element 4 mounted in a proximal portion thereof, a first shift member 5 disposed to a side of the takeup element 4, and a speed indicator 6 disposed rearwardly and having numeric speed stage marks A. The lever bracket 3 further includes a second shift lever 7 and a wire receiving case 3a arranged in a forward portion. These components constitute a shifting apparatus for a bicycle which forms a unit with the brake lever. A control cable 8 connected at one end thereof to a derailleur (not shown) has an outer tube supported at the other end by an outer holder 9 attached to the wire receiving case 3a. An inner wire 8a at the other end extends from the outer holder 9, as guided by a plurality of guide rollers 10 arranged inside the wire receiving case 3a, into the proximal portion of the lever bracket 3 to be connected to the takeup element 4. The takeup element 4 is rotatable forward or backward by the first shift member 5 and second shift lever 7 to pull or relax the inner wire 8a. The cyclist may effect a shifting operation while checking, with ease by looking at the indicator 6, a speed stage to which the derailleur is switched.

Figure 3:
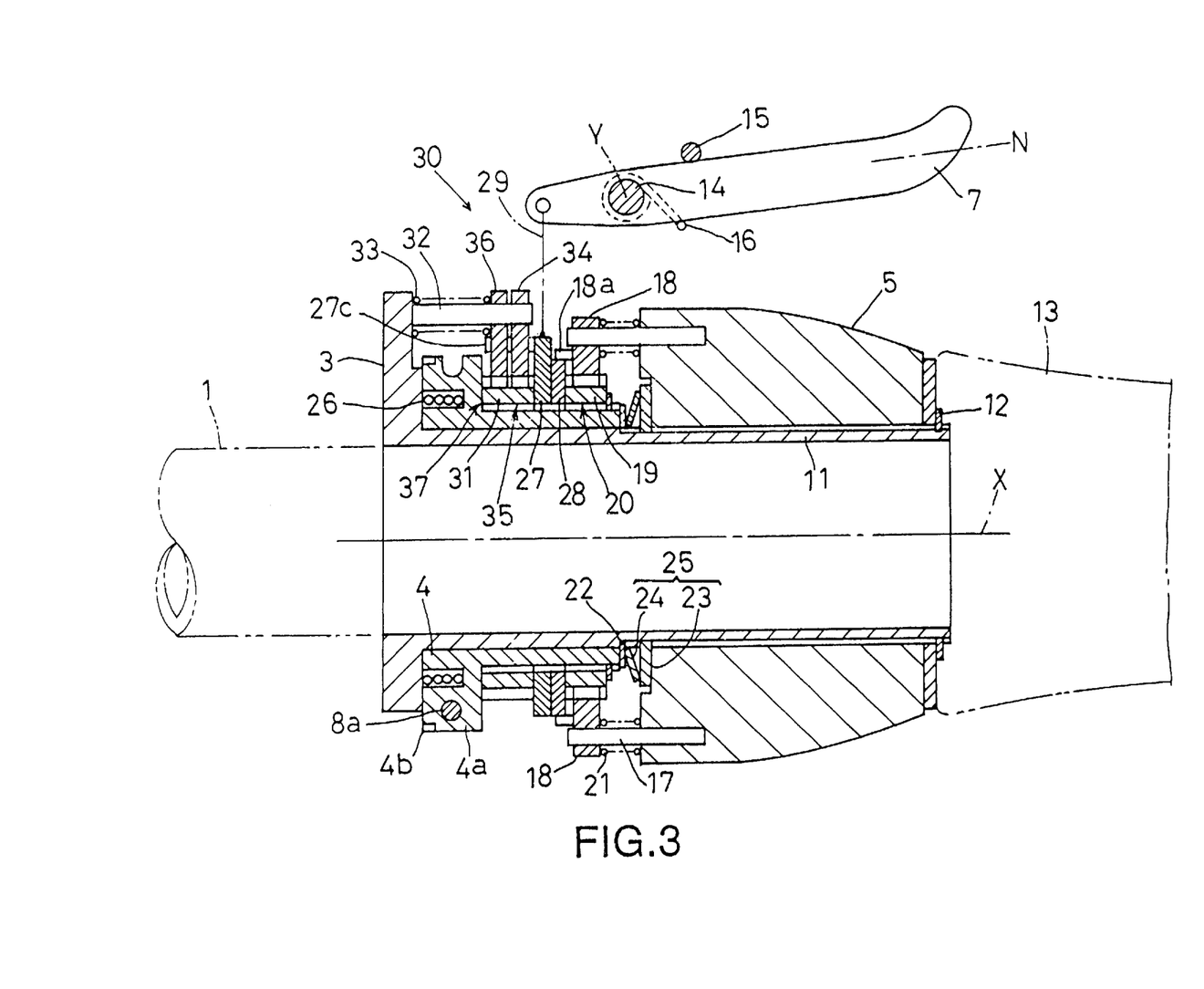
FIG. 3 is a sectional view of the shifting apparatus of FIG. 1.

As shown in FIG. 3, the takeup element 4 and first shift member 5 are formed tubular to be rotatably mounted on a support sleeve 11 formed integral with the proximal portion of the lever bracket 3. The takeup element 4 and first shift member 5 are retained in place by a stopper ring 12. The support sleeve 11 is a tubular body coaxially mounted on the handlebar 1 for supporting the first shift member 5 inwardly of a grip 13 fixed to the handlebar 1. The first shift member 5 is rotatable by the thumb of a hand holding the grip 13, about the handlebar 1 using a handlebar axis X as its rotational axis. The takeup element 4 also is rotatable about the handlebar 1 using a handlebar axis X as its rotational axis.

As shown in FIG. 3, the second shift lever 7 is pivotably attached to a support shaft 14 of the lever bracket 3. The shift lever 7 automatically returns to a neutral position N to contact a lever stopper 15 under the biasing force of a return spring 16. When the lever bracket 3 is assembled to the handlebar 1, the support shaft 14 is disposed forwardly of the handlebar 1 and has an axis Y thereof extending vertically. That is, as shown in FIG. 1, the second shift lever 7 is formed as a swing lever having a control portion 7a thereof located forwardly of the handlebar 1 and pivotable about the axis Y by the first finger of the hand holding the grip 13. Thus, the control portion 7a may be operated with the first finger while the thumb of the same hand is kept on the grip 13 or first shift member 5, with the other fingers and palm resting on the grip 13 for stability.

The first shift member 5 and second shift lever 7 are operable to rotate the takeup element 4 through a construction shown in FIGS. 3 through 8.

Figure 4:
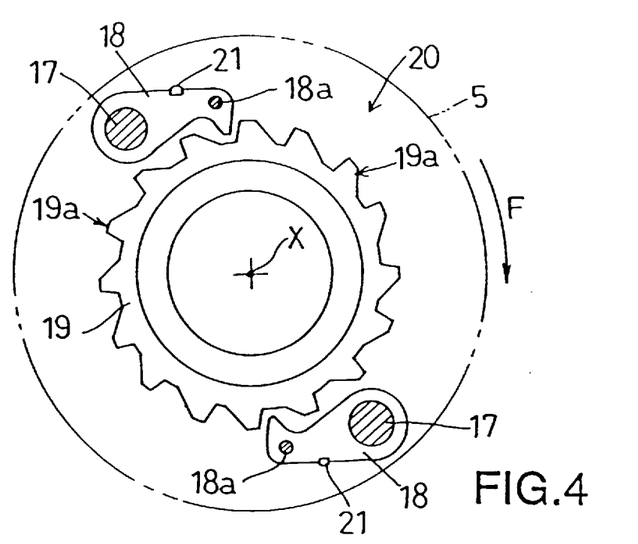
FIG. 4 is a side view of a clutch for interlocking a takeup element to a first shift member of the shifting apparatus of FIG. 1.

A clutch 20 for transmitting torque from the first shift member 5 to the takeup element 4 includes a pair of clutch pawls 18 pivotably supported on the first shift member 5 through support axes 17, and a clutch gear 19 splined to one end of the takeup element 4 to be rotatable therewith. Each of the clutch pawls 18 is biased by a spring 21 to engage any one of a plurality of teeth of the clutch gear 19.

The first shift member 5 is restrained from moving toward the takeup element 4 by an annular fixed plate 22 placed in contact with a plate mounting shoulder formed on the support sleeve 11 between the takeup element 4 and first shift member 5. A friction plate 23 and a brake spring 24 are press fit between the fixed plate 22 and first shift member 5. These friction plate 23 and brake spring 24 constitute a brake 25 for applying a fixed, light braking force to the first shift member 5. Consequently, the shift member 5 is rotatable only by a force exceeding this braking force. The friction plate 23 is splined to the support sleeve 11 not to be rotatable but only slidable relative thereto. The brake spring 24 biases the friction plate 23 into constant contact with an end surface of the first shift member 5. Thus, the first shift member 5 receives braking action, based on friction, of the brake 25.

As shown in FIG. 3, an unwind spring 26 is mounted in an annular hollow formed in a takeup drum portion 4a of the takeup element 4. The unwind spring 26 is connected at one end thereof to the lever bracket 3, and at the other end to the takeup element 4. The unwind spring 26 is elastically deformable by a rotation in a winding direction of the takeup element 4. This elastic deformation produces an elastic restoring force to bias the takeup element 4 in an unwinding direction.

An operation of the second shift lever 7 is transmitted to the takeup element 4 through an interlock mechanism 30. The interlock mechanism 30 includes the unwind spring 26, a release plate 27 relatively rotatably mounted between the drum portion 4a of the takeup element 4 and the clutch gear 19, a pair of declutching members 28 arranged between the release plate 27 and the clutch gear 19, and an interlocking rod 29 for interlocking the second shift lever 7 and release plate 27.

Figures 5, 6:
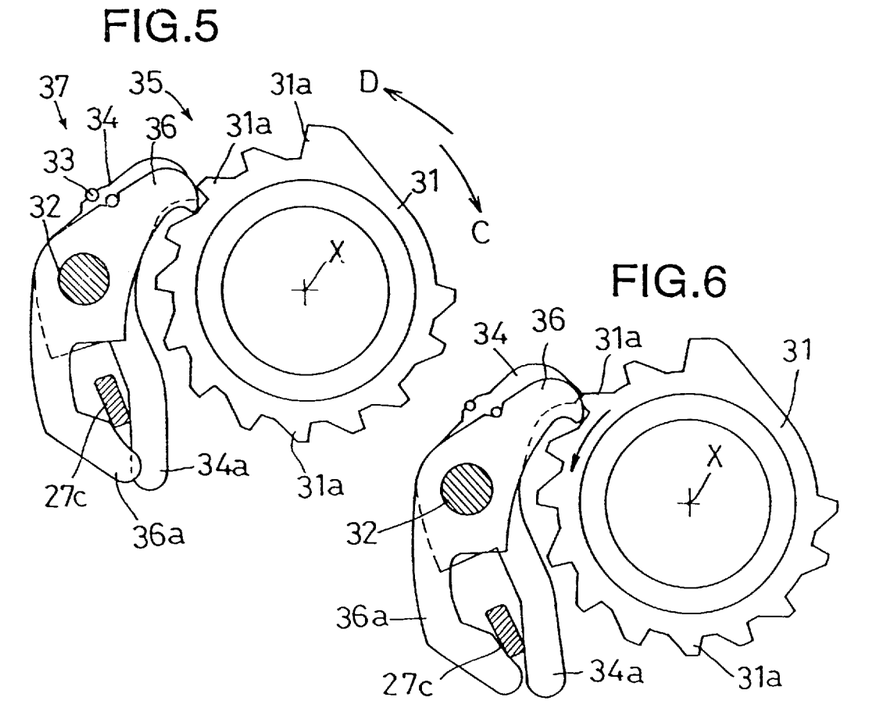
FIG. 5 is an explanatory view of a positioning mechanism and a straight-through return stopper mechanism for acting on the takeup element, showing a positioning pawl and a return stopper pawl engaging a ratchet tooth.
FIG. 6 is an explanatory view showing the takeup element rotated backward from the position shown in FIG. 5, with the return stopper pawl remaining in engagement and the positioning pawl disengaged from the ratchet tooth.

As shown in FIG. 5, a positioning mechanism 35 for maintaining the takeup element 4 in a selected rotational position includes a ratchet wheel 31 mounted between the drum portion 4a of the takeup element 4 and the release plate 27 to be rotatable therewith through spline engagement, and a positioning pawl 34 pivotably attached to the lever bracket 3 through a support axis 32 and biased by a spring 33 to engage one of teeth 31a of the ratchet wheel 31.

As also shown in FIG. 5, a straight-through return stopper mechanism 37 is provided to prevent overshooting of the takeup element 4 when rotated in the unwinding direction by operation of the second shift lever 7. This mechanism 37 includes a return stopper pawl 36 pivotably attached to the support axis 32, and the ratchet wheel 31.

Thus, in a normal situation where the cyclist takes no control action, the clutch 20 is engaged by action of the pawl springs 21. At the same time, the positioning mechanism 35 has the positioning pawl 34 engaging a tooth 31a of the ratchet wheel 31 to hold the takeup element 4 against rotation in the unwinding direction. In this condition, the first shift member 5 is operable to rotate the takeup element 4 only when the first shift member 5 is rotated in a direction F to move an upper surface thereof toward the cyclist. When the first shift member 5 is rotated in the direction F, the clutch 20 transmits the torque of the first shift member 5 to the takeup element 4, whereby the takeup element 4 is rotated in a direction C to wind the inner wire 8a thereon. With this rotation, the ratchet wheel 31 rotatable with the takeup element 4 rotates while pushing out the positioning pawl 34 and return stopper pawl 36 by camming action occurring from a shape of the tooth 31a. With rotation by each pitch of the takeup element 4 to shift the derailleur by one stage, the positioning pawl 34 engages a tooth 31a next to the tooth 31a engaged previously, whereby the positioning mechanism 35 becomes operative again.

When the first shift member 5 is operated to rotate the takeup element 4 in the winding direction, the takeup element 4 may be rotated, if desired, straight to a position where the positioning pawl 34 engages the last tooth 31a of the ratchet wheel 31. The derailleur may be shifted only by one stage, or by two or more stages. For example, the derailleur may be shifted from the lowest speed to the highest speed or vice versa by rotating the takeup element 4 straight through.

Figure 7:
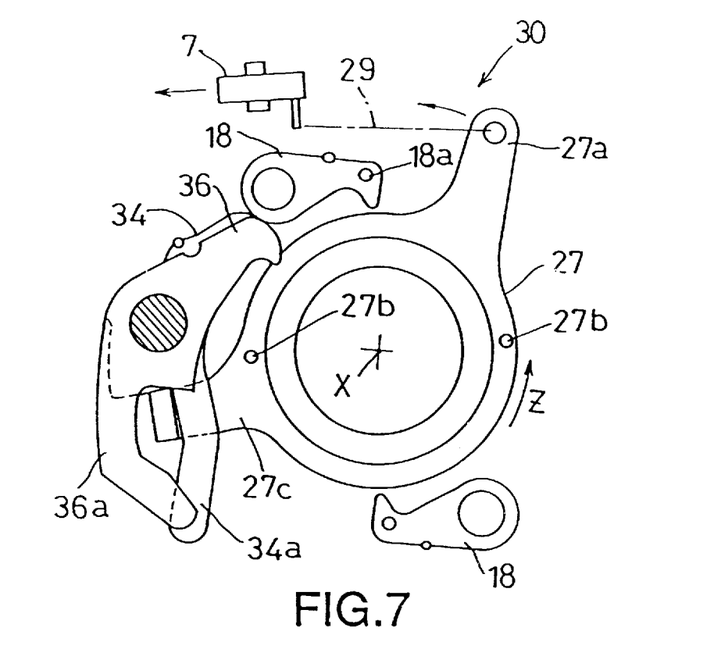
FIG. 7 is an explanatory view of an interlock mechanism between a second shift lever and the takeup element in the apparatus shown in FIG. 1.
Figure 8:
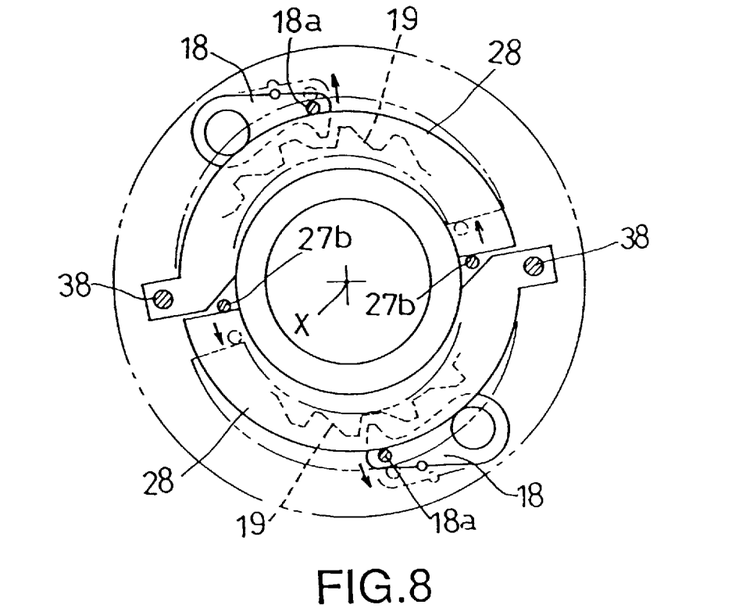
FIG. 8 is an explanatory view of a declutching mechanism in the apparatus shown in FIG. 1.

On the other hand, the takeup element 4 may be rotated in the unwinding direction by swinging the second shift lever 7 toward the handlebar 1 from neutral position N. With this operation, as shown in FIG. 7, the interlocking rod 29 interlocking the second shift lever 7 and release plate 27 pulls a control arm 27a of the release plate 27, whereby the release plate 27 is rotated in a direction Z from the position shown in FIG. 7. As a result, a pair of control pins 27b provided on the release plate 27 move from inoperative positions shown in solid lines in FIG. 8 to operative positions shown in phantom lines, to push free ends of the declutching members 28, respectively. Each declutching member 28 is attached at the other end to the lever bracket 3 through a pivot pin 38. Consequently, both declutching members 28, based on the above pushing action, swing about the pivot pins 38 away from the takeup element 4. That is, the declutching members 28 move from clutch engaging positions shown in solid lines in FIG. 8 to clutch disengaging positions shown in phantom lines, to push pins 18a of the clutch pawls 18, respectively, whereby the clutch pawls 18 become disengaged from the clutch gear 19. Thus, the clutch 20 is now disengaged. However, even though the clutch 20 is disengaged, the takeup element 4 does not rotate in the unwinding direction yet. This is based on the operation of the straight-through return stopper mechanism 37 described next.

As shown in FIG. 7, the release plate 27 includes a release arm 27c having a distal end thereof situated between an arm 34a of the positioning pawl 34 and an arm 36a of the return stopper pawl 36. With the rotation in the direction Z of the release plate 27, the release arm 27c moves from an inoperative position shown in FIG. 7 to an operative position shown in FIG. 5. That is, the release arm 27c pushes the arm 36a of the return stopper pawl 36 whereby the return stopper pawl 36 swings to move a tip end thereof to a position between teeth 31a of the ratchet wheel 31. As a result, as shown in FIG. 5, the straight-through return stopper mechanism 37 becomes operative. When, subsequently, the takeup element 4 is rotated in the unwinding direction, the takeup element 4 is rotated only by one pitch corresponding to shifting by one speed stage of the derailleur. That is, in the condition shown in FIG. 5, a tip end of the positioning pawl 34 remains in contact with the tooth 31a of the ratchet wheel 31, so that the takeup element 4 remains incapable of rotating in the unwinding direction. When the second shift lever 7 is further swung toward the handlebar 1, the release plate 27 is further rotated in the direction Z to move the release arm 27c to an operative position shown in FIG. 6. At this time, the release arm 27c pushes the arm 34a of the positioning pawl 34 whereby the positioning pawl 34 becomes disengaged from the tooth 31a of the ratchet wheel 31. When the positioning pawl 34 becomes disengaged from the tooth 31a, the return stopper pawl 36 remains operative to stop the ratchet wheel 31 rotating to a large extent. However, in the state shown in FIG. 6, the ratchet wheel 31 has already rotated slightly in the unwinding direction, and so the tooth 31a engaged by the positioning pawl 34 a short time ago is now slightly displaced in the unwinding direction from the tip end of the positioning pawl 34. Thus, the takeup element 4 remains still if the second shift lever 7 remains in the position to which it has been swung. When the cyclist releases the second shift lever 7 to allow the shift lever 7 to return to the neutral position N, the return stopper pawl 36 automatically becomes disengaged from the tooth 31a, and the positioning pawl 34 catches the next tooth 31a also automatically and substantially at the same time. Thus, with a series of operations to swing and return the second shift lever 7, the positioning mechanism 35 is capable of retaining the takeup element 4 in place after the takeup element 4 has rotated by one pitch.

In this embodiment, the second shift lever 7 is operable only to rotate the takeup element 4 in the unwinding direction. Each time the second shift lever 7 is swung from the neutral position N, the interlock mechanism 30 shown in FIGS. 3 and 7 causes the takeup element 4 to rotate in a direction D under the forces of the unwind spring 26 and inner wire 8a, to unwind the inner wire 8a. The straight-through return stopper mechanism 37 allows the takeup element 4 to rotate only by one pitch to shift the derailleur by one stage. Then, the positioning mechanism 35 retains the takeup element 4 in that rotational position.

When the takeup element 4 rotates in the unwinding direction, the declutching members 28 of the interlock mechanism 30 disengage the clutch 20 so that the rotation of the takeup element 4 is not transmitted to the first shift member 5. Further, since the brake 25 applies a minor braking force to the first shift member 5, the cyclist need not hold the first shift member 5 against rotation. Consequently, the cyclist may operate the second shift lever 7 to rotate the takeup element 4 in the unwinding direction while keeping his or her hand on the first shift member 5 remaining still. The cyclist may keep the palm of his or her hand on the grip 13, with the thumb touching the first shift member 5. In this steady gripping condition, the cyclist may operate the second shift lever 7. Since the first shift member 5 does not rotate during operation of the second shift lever 7, the cyclist need not take the trouble of moving the thumb to present no interference with the pivotal movement of the second shift lever 7.

Figure 2:
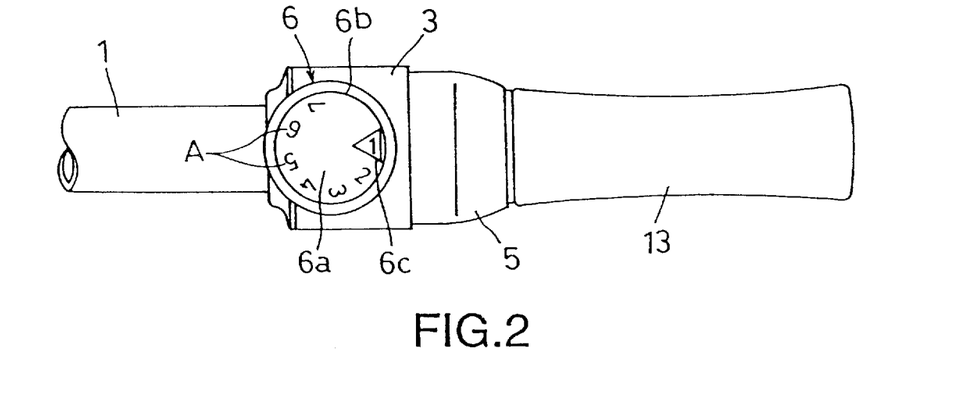
FIG. 2 is a front view of the shifting apparatus of FIG. 1 showing a speed stage indicator.

The speed indicator 6 is attached to the lever bracket 3 to be rotatable about an axis extending substantially perpendicular to the handlebar axis X. The speed indicator 6 includes a rotatable member 6a having the speed marks A, and a fixed member 6b attached to the lever bracket 3 for covering the rotatable member 6a. The fixed member 6b is formed of a transparent material to enable a visual observation of the speed marks A. The rotatable member 6a is rotatable with the takeup element 4 through engagement with a gear 4b (shown in FIG. 3) formed at an end of the takeup element 4. When the takeup element 4 reaches a selected rotational position, one of the speed marks A corresponding to the selected speed stage of the derailleur moves to a position opposed to a pointer 6c provided on the fixed member 6b as shown in FIG. 2, thereby to indicate the selected speed stage.

Figure 9:
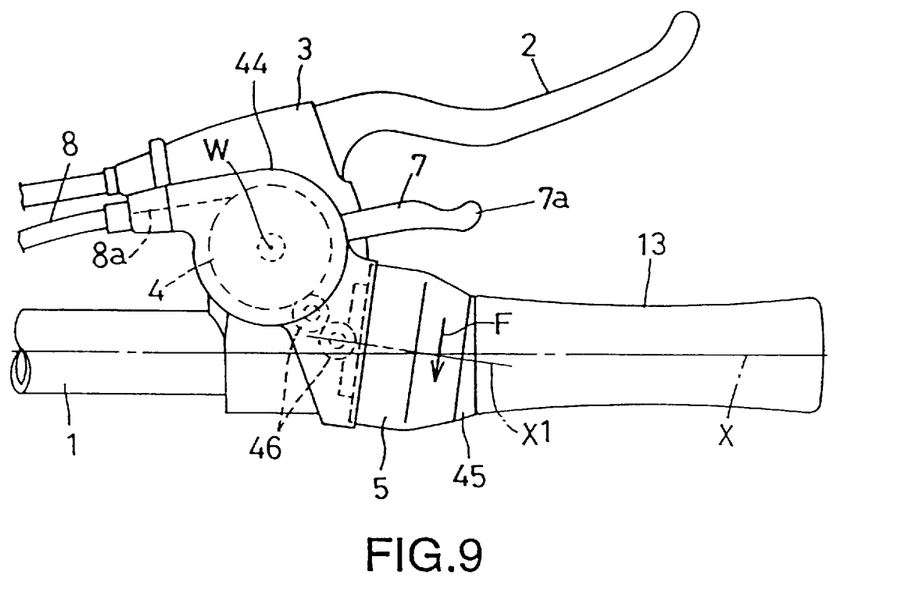
FIG. 9 is a plan view of a shifting apparatus in another embodiment of the present invention.
Figure 10:
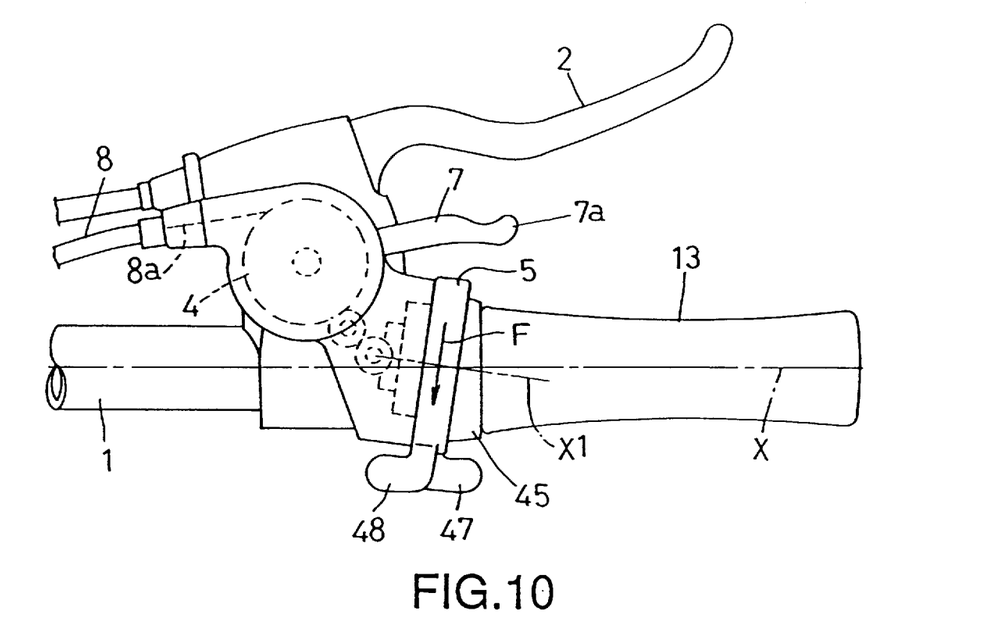
FIG. 10 is a plan view of a shifting apparatus in a further embodiment of the invention.
Figure 11:
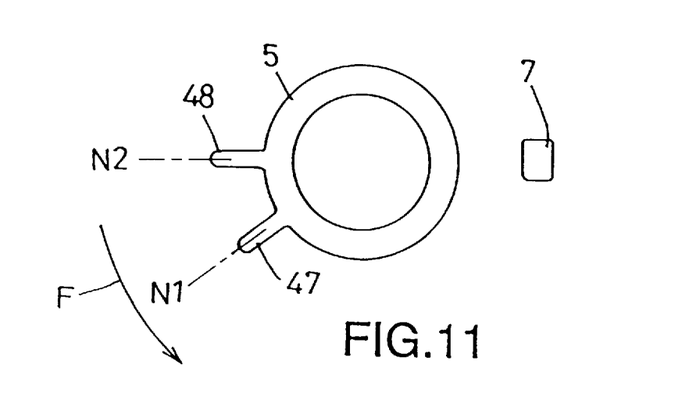
FIG. 11 is an explanatory view of a single-stage shift member and a multistage shift member in the apparatus shown in FIG. 10.

FIGS. 9 through 11 show shifting apparatus in different embodiments of the present invention.

In the embodiment shown in FIG. 9, a takeup element 4 is attached to a lever bracket 3 to be rotatable about a vertical axis W as distinct from the handlebar axis X. The takeup element 4 is enclosed in a case 44. A first shift member 5 is mounted at an angle to a support sleeve 45 formed integral with the lever bracket 3. When mounted on the handlebar 1, the first shift member 5 is rotatable about an axis X1 extending at an angle to the handlebar axis X. Specifically, this axis X1 moves progressively away from the handlebar axis X as it extends toward a middle position of the handlebar 1. Thus, when the cyclist rotates the first shift member 5, with his or her thumb, to move an upper surface thereof toward the cyclist, while holding the grip 13 of the handlebar 1, the tip of the thumb gradually moves toward the longitudinally middle position of the handlebar. This may be said a natural movement not straining the hand. That is, the rotational axis of the first shift member 5 is so oriented that the hand makes a natural movement when rotating the takeup element 4 in the winding direction. This allows the operation to be carried out relatively easily. In this embodiment, a torque of the first shift member 5 is transmitted to the takeup element 4 through an interlock mechanism including a rotatable gear 46. However, the interlock mechanism may use a wire instead of the rotatable gear 46.

As distinct from the first shift member 5 in each of the foregoing embodiments, a shift member may be employed which is rotatable in opposite directions about the handlebar to rotate the takeup element in both the winding direction and unwinding direction.

FIG. 10 shows a further example of shifting member mounted on the handlebar. This shifting member is ring-shaped, and includes thumb hooks on which the cyclist places his or her thumb or finger to rotate the shifting member. This shifting member may be rotatable at least in one direction about the handlebar to rotate the takeup element at least in one of the winding direction and unwinding direction. The shifting member may have a varied shape such as tubular or annular. The shift member attached to a fixed member may be a push-button type shift member, or may be pivotable in opposite directions to rotate the takeup element in both the winding direction and unwinding direction. This shift member may be capable of rotating the takeup element in either the winding direction or the unwinding direction. In sum, the shift member mounted on the handlebar may be operable to rotate the takeup element in at least one of the winding direction and unwinding direction, with the shift member attached to the fixed member also being operable to rotate the takeup element in at least one of the winding direction and unwinding direction. After all, the takeup element may be rotatable by two shift members, one of which is rotatable about the handlebar, and the other is attached to a position invariable with rotation of the one shift member. Then, the cyclist may selectively use the shift member rotatable on the handlebar and the shift member attached to the fixed member as necessary or as desired. Shifting operations may be carried out using the shift member rotatable about the handlebar and the shift member attached to the fixed member to be operable while gripping the handlebar, thereby fulfilling the object of the present invention. In order that both shift-up and shift-down may be effected by using only one of the rotatable shift member on the handlebar and the shift member attached to the fixed member, the shift member on the handlebar or the shift member attached to the fixed member may constantly be interlocked to the takeup element to be movable together.

In the foregoing embodiments, the takeup element 4 is rotatable in the unwinding direction by action of the unwind spring 26 and tension of the inner wire 8a. The unwind spring 26 may be dispensed with, so that the takeup element 4 is rotatably only by tension of the inner wire 8a. Thus, the second shift lever 7 is called simply the shift member 7 herein. The clutch 20, and the interlock mechanism including the rotatable gear 46 as shown in FIG. 9, are called a first interlock mechanism 20 for rotating the takeup element in response to rotation of the first shift member. The interlock mechanism 30 is called a second interlock mechanism 30 for rotating the takeup element in response to movement of the second shift member 7 relative to the fixed member.

In the embodiment shown in FIG. 10, the first shift member 5 rotatably mounted on the handlebar 1 includes a first thumb hook 47 and a second thumb hook 48. This first shift member 5 is fitted on the support sleeve 45 to be rotatable about an axis X1 extending at an angle to the handlebar axis X, as is the shift member 5 shown in FIG. 9. For rotating the first shift member 5, the cyclist places his or her thumb on the first thumb hook 47 or second thumb hook 48 to rotate the shift member 5 in a direction F so that an upper surface thereof moves toward the cyclist. The first shift member 5 is rotatable back to neutral position by the force of a return spring. When the first shift member 5 is in the neutral position, the first thumb hook 47 and second thumb hook 48 lie in neutral positions N1 and N2, respectively, as shown in FIG. 11. The neutral position N2 of the second thumb hook 48 is located higher than the neutral position N1 of the first thumb hook 47. The first thumb hook 47 is better suited for use in shifting by one stage than the second thumb hook 48, since the tip of the thumb may be raised by a less amount, thereby to realize a relatively easy operation. The second thumb hook 48 is better suited than the first thumb hook 47 when shifting two or more stages in one stroke. This is because the second thumb hook 48 facilitates an operation to rotate the first shift member 5 through a relatively large angle, and assures a reliable operation despite a rotation of the takeup element 4 through a plurality of pitches.

Where the takeup element is rotatable in the unwinding direction by the action of both or one of the unwind spring and inner wire, a rotation in the unwinding direction of the takeup element caused by an operation of the second shift member may be set to two, three or more pitches as necessary. Thus, a pitch of rotation determined by the straight-through return stopper mechanism 37 is called herein a set pitch of rotation.

The axis Y of the second shift lever 7 may, instead of extending vertically, extend at an angle to the vertical, perpendicular to the handlebar axis X, or at an angle to and crossing the handlebar axis X. With such an arrangement, as where the second shift lever 7 is pivotable about the vertical axis Y, the second shift lever 7 may relatively easily be operated with the first finger of the hand holding the handlebar 1. Thus, these axes are called herein axis Y different from the handlebar axis X.

The foregoing embodiments employ an engaging device such as the positioning mechanism 35 for retaining the takeup element in a selected rotational position. The engaging device may be replaced by a friction device having a friction member for acting on the takeup element or a rotatable member interlocked to the takeup element. Thus, these devices are called simply herein the positioning mechanism 35.

What is claimed is:

1. A shifting apparatus for a bicycle comprising:
   a takeup element supported to be rotatable for pulling and releasing a control cable;
   a first shift member supported by a handlebar to be rotatable substantially along an outer periphery thereof for rotating the takeup element in at least one of the pulling or the releasing direction, the first shift member being rotatable separately from the takeup element;
   a first interlock mechanism for interlocking the first shift member and the takeup element when the first shift member rotates in a first direction for rotating the takeup element in one of the pulling or the releasing direction;
   a second shift member supported by the handlebar to be displaceable relative thereto for rotating the takeup element in the other one of the pulling or the releasing direction;
   a positioning mechanism for retaining the takeup element in a selected angular position;
   a second interlock mechanism for releasing the positioning mechanism in response to operation of the second shift member for allowing the takeup element to rotate in the other one of the pulling or the releasing direction; and
   a declutching mechanism responsive to operation of the second shift member for releasing the first interlock mechanism so that the first shift member is allowed to remain stationary while the takeup element rotates in the other one of the pulling or the releasing direction.

2. The apparatus according to claim 1 wherein the first interlock mechanism comprises a clutch which transmits a torque of the first shift member to the takeup element.

3. The apparatus according to claim 2 wherein the clutch transmits the torque from the first shift member to the takeup element in one direction only.

4. The apparatus according to claim 2 wherein the declutching mechanism disengages the clutch during operation of the second shift member.

5. The apparatus according to claim 1 wherein the first shift member operates to rotate the takeup element in the pulling direction, and wherein the second shift member operates to rotate the takeup element in the releasing direction.

6. The apparatus according to claim 1 wherein the takeup element has an axis of rotation different from an axis of rotation of the first shift member.

7. The apparatus according to claim 6 wherein the first interlock mechanism includes a gear for transmitting torque from the first shift member to the takeup element.

8. The apparatus according to claim 6 wherein the axis of rotation of the first shift member is inclined relative to an axis of the handlebar.

9. The apparatus according to claim 1 wherein the first shift member comprises a ring rotatable along the outer periphery of the handlebar.

10. The apparatus according to claim 9 wherein the ring includes a thumb hook projecting radially from the ring.

11. The apparatus according to claim 10 further comprising return means for automatically returning the first shift member to an initial position after rotation of the first shift member to perform a shifting operation is completed.

12. The apparatus according to claim 10 wherein the second shift member comprises a lever.

13. The apparatus according to claim 12 wherein an axis of rotation of the takeup element is positioned between the thumb hook and the lever.

14. The apparatus according to claim 1 further comprising rotation limiting means for limiting the amount of rotation of the takeup element during operation of the second shift member.

15. The apparatus according to claim 1 further comprising biasing means for biasing the takeup element in a return direction.

16. The apparatus according to claim 1 wherein the first shift member comprises a ring.

17. The apparatus according to claim 16 wherein the second shift member comprises a lever.

18. The apparatus according to claim 1 wherein the takeup element is structured for winding the control cable for pulling the control cable, and wherein the takeup element is structured for unwinding the control cable for releasing the control cable.

19. The apparatus according to claim 18 wherein the first shift member comprises a ring.

20. The apparatus according to claim 19 wherein the second shift member comprises a lever.

* * * * *